June 18, 1935.    H. P. CLAUSEN    2,005,362

MAGNIFYING ATTACHMENT FOR SLIDE RULES

Filed Jan. 5, 1933

INVENTOR
Henry P. Clausen
BY Joseph L. Wright
ATTORNEY

Patented June 18, 1935

2,005,362

UNITED STATES PATENT OFFICE 2,005,362

MAGNIFYING ATTACHMENT FOR SLIDE RULES

Henry P. Clausen, White Plains, N. Y.

Application January 5, 1933, Serial No. 650,284

2 Claims. (Cl. 88—39)

My invention relates to improvements in magnifying attachments for slide rules.

The object of my invention is the provision of a lens which is slidably held to the surface of the glass or transparent index portion of the rule by suction. The lens, which is of the plano convex type, is so designed that the flat or plane surface when moistened adheres to the glass index portion of the rule.

Standard slide rules are usually provided with upper and lower scale portions which are slidably adjustable with one another.

While I have illustrated and described my invention as applied to slide rules, it is readily apparent that my invention may be applied to any type of calculating machine or device employing calibrated scales.

My invention may be readily applied to such instruments or devices as automobile speedometers or similar instruments embodying calibrated scales which require quick or accurate readings.

In the present instance, I have illustrated and described my invention as applied to a standard form of slide rule or calculating device.

My invention is illustrated in the accompanying drawing, wherein.

Figure 1:
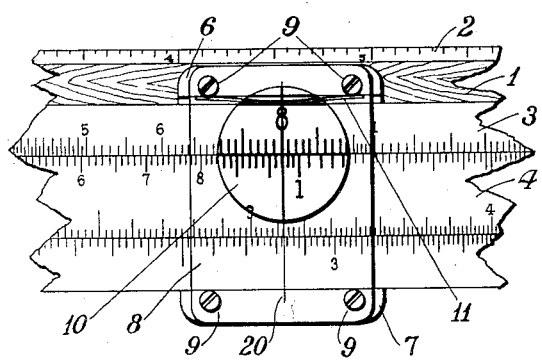
Figure 1 is a plan view showing the lens of my invention applied to the upper scale of a portion of a slide rule.
Figure 2:
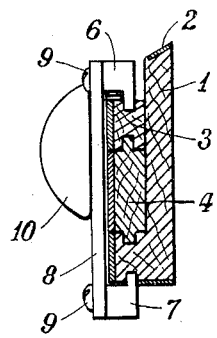
Fig. 2 is an end view of Fig. 1.

Referring to Figs. 1 and 2, the bottom or base 1 of the slide rule is provided with grooves which are engaged by the tongues of the portions 4 and 7, as plainly shown.

The slidable portion 4 is also plainly shown with a tongue which engages a groove in portion 3. The fixed portion 3 is provided with an additional groove which is engaged by the tongue of portion 6.

The portions 6 and 7 serve to support the glass or index portion 8 which is held in position by the screws 9. The portions 3, 4 are provided with calibrated scales as shown in Fig. 1.

The scales of portions 3 and 4, which are in adjustable relation to one another, constitute the upper scale; while the scales of portion 4, which are in adjustable relation to one another, constitute the lower scale.

The index or transparent portion 8, which may be of glass or other transparent material, has a pointer or line 20 which cooperates with the calibrations of the upper and lower scales.

As plainly indicated in Fig. 1, the lens 10 when in the upper position as shown magnifies the calibrations of the upper scale so that the readings may be readily made. When the lens 10 is in the position shown in Fig. 3, the calibrations of the lower scale are readily ascertained.

Figure 3:
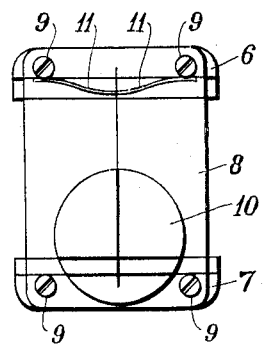
Fig. 3 is a plan view of the index portion of the slide rule showing the lens in position with the lower scale.

In ordinary usages, the upper scale readings may be read without the magnifying effect, and in such case the lens 10 is slid to the lower position, as in Fig. 3. When the magnifying effect is not needed, when reading the lower scale, the lens 10 is slid to the upper position, as in Fig. 1.

Whenever it is desired to remove the lens 10, it may be slid to the right or left, thus removing the adhering or suction effect with the glass portion 8.

Figure 4:
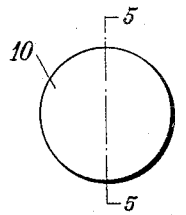
Fig. 4 is a plan view of the lens.
Figure 5:
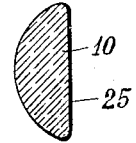
Fig. 5 is a section of Fig. 4, on the line 5—5.

As shown in Figs. 4 and 5, the lens 10 is of the plano convex type. In order to cause the lens to adhere to the index portion 8, the flat or plane surface 25 is moistened and placed upon the surface of the portion 8, and thereafter it may be slidably moved to any desired position.

It is readily apparent that the lens 10 may be applied to automobile speedometers, voltmeters, ammeters, etc., in order to magnify the scale to give a quick and accurate reading when desired without the necessity of providing special attachments which interfere with standard types of instruments.

Having thus described my invention, what I desire to secure by Letters Patent is:

1. The combination of a slide rule having an upper and lower scale, a graduated member slidable longitudinally between said scales, a flat transparent member having an index line connecting the graduations on the scales and on the graduated member, said transparent member being slidable longitudinally over the scales and over the graduated member, and a plano spherically convex lens slidably held to the transparent member by suction whereby it may be freely moved thereon from the upper to the lower scale.

2. The combination of a slide rule provided with an upper and a lower horizontally positioned scale, a graduated member slidable longitudinally between the scales, a flat transparent member movable along the slide rule and having an index line for connecting the upper and lower scales and the graduations on the sliding member between the scales, a lens having its entire surface polished, said lens having a circular flat base portion slidably attached by suction to the transparent member and independently movable thereon in any desired direction to either scale while remaining adhesively attached to the transparent member, said lens also having a semi-spherical upper portion, the formation of the lens being such that the scales and the graduated member at or near the base of the lens is observable in magnified form along all radial lines extending therefrom.

HENRY P. CLAUSEN.